US012303968B2

(12) United States Patent
Henriksson

(10) Patent No.: US 12,303,968 B2
(45) Date of Patent: May 20, 2025

(54) MATERIAL FORMING

(71) Applicant: Cell Impact AB, Karlskoga (SE)

(72) Inventor: Erika Henriksson, Skoghall (SE)

(73) Assignee: Cell Impact AB, Karlskoga (SE)

( * ) Notice: Subject to any disclaimer, the term of this patent is extended or adjusted under 35 U.S.C. 154(b) by 0 days.

(21) Appl. No.: 18/638,176

(22) Filed: Apr. 17, 2024

(65) Prior Publication Data

US 2024/0261848 A1 Aug. 8, 2024

Related U.S. Application Data

(62) Division of application No. 17/272,248, filed as application No. PCT/EP2019/076040 on Sep. 26, 2019.

(30) Foreign Application Priority Data

Sep. 28, 2018 (SE) .................................... 1851166-7

(51) Int. Cl.

| | |
|---|---|
| ***B21J 9/02*** | (2006.01) |
| ***B21D 28/00*** | (2006.01) |
| ***B21J 5/00*** | (2006.01) |
| ***B21J 7/28*** | (2006.01) |
| ***B30B 15/06*** | (2006.01) |

(52) U.S. Cl.

CPC .............. *B21J 9/02* (2013.01); *B21D 28/002* (2013.01); *B21J 5/00* (2013.01); *B21J 7/28* (2013.01); *B30B 15/065* (2013.01)

(58) Field of Classification Search

CPC ......... B21J 5/00; B21J 7/02; B21J 7/04; B21J 7/28; B21J 9/02; B21J 9/12; B21J 13/02; B21J 13/03; B30B 15/0076

USPC .......................... 72/465.1, 466, 466.8, 466.9

See application file for complete search history.

(56) References Cited

U.S. PATENT DOCUMENTS

| | | | | |
|---|---|---|---|---|
| 3,777,543 | A | 12/1973 | Kokkola et al. | |
| 2004/0040364 | A1 | 3/2004 | Olsson | |
| 2017/0136522 | A1* | 5/2017 | Ivarson | B21J 13/06 |

FOREIGN PATENT DOCUMENTS

| | | | |
|---|---|---|---|
| DE | 2341316 | A1 * | 2/1975 |
| DE | 2500605 | A1 | 7/1976 |
| DE | 102005006742 | A1 | 8/2006 |
| FR | 1119828 | A | 6/1956 |

(Continued)

OTHER PUBLICATIONS

International Search Report Issued in International Patent Application No. PCT/EP2019/076040 on Jun. 17, 2020, 5 pages.

*Primary Examiner* — Jared O Brown

(74) *Attorney, Agent, or Firm* — Schott, P.C.

(57) ABSTRACT

A method for material forming uses a movable tool and a drive unit the method including moving the drive unit to provide kinetic energy to the tool, for the tool to strike a work material, so as to form the work material the method including providing an impact head between the drive unit and the movable tool, and providing the kinetic energy to the tool by the drive unit striking the impact head, the impact head (extending in the direction of the stroke from an impact end to a base region, where the base region is closer to the tool than the impact end. The method includes arranging the impact head so that the impact end has laterally, in relation to the direction of the stroke, a smaller extension than the base region.

12 Claims, 5 Drawing Sheets

(56) References Cited

FOREIGN PATENT DOCUMENTS

| | | | |
|---|---|---|---|
| FR | 2099506 | A1 | 3/1972 |
| SE | 527780 | C2 | 6/2006 |

* cited by examiner

MATERIAL FORMING

TECHNICAL FIELD

The invention relates to a method for material forming. The invention also relates to an apparatus for material forming.

BACKGROUND

The invention is advantageously used for High velocity forming (HVF), but may according to other embodiments of the invention be used for material forming involving other velocities than used for HVF. HVF is herein also referred to as High velocity material forming. HVF of metals is also known as High velocity metal forming.

In conventional metal forming operations, a force is applied to the metal to be worked upon, by using simple hammer blow or a power press; the heavy tools used are moved at a relatively low velocity. Conventional techniques include methods such as Forging, Extrusion, Drawing, and Punching, etc. Among other technologies, there are also welding/burning technologies, such as burning by laser, oxy-fuel burning, and plasma.

HVF involves imparting a high kinetic energy to a tool, by giving it to a highly velocity, before it is made to hit a work piece. HVF includes methods such as hydraulic forming, explosive forming, electro hydraulic forming, and electro-magnetic forming, for example by means of an electric motor. In these forming processes a large amount of energy is applied to the work piece during a very short interval of time. The velocities of HVF may typically be at least 1 m/s, preferably at least 3 m/s, preferably at least 5 m/s. For example, the velocities of HVF may be 1-20 m/s, preferably, 3-15 m/s, preferably 5-15 m/s. HVF may be regarded as a process in which the material shaping forces are obtained from kinetic energy, whereas, in conventional material forming, the material forming forces are obtained from pressure, e.g. hydraulic pressure.

An advantage of HVF is provided by the fact that many metals tend to deform more readily under a very fast application of a load. The strain distribution is much more uniform in a single operation of HVF as compared to conventional forming techniques. This results in making it easy to produce complex shapes without inducing unnecessary strains in the material. This allows forming of complex parts with close tolerances, and forming of alloys that might not be formable by conventional metal forming. For example, HVF may be used in the manufacturing of metal flow plates used in fuel cells. Such manufacturing requires small tolerances.

Another advantage with HVF is that, while the kinetic energy of a tool is linearly proportional to the mass of the tool, it is squarely proportional to the velocity of the tool, and therefore, compared to conventional metal forming, considerably lighter tools may be used in HVF.

It is known in HVF to allow a plunger to be driven from a start position by a hydraulic pressure in a first chamber, in order to transfer, by a stroke, a high kinetic energy to a tool, which in turn processes a work material, e.g. a workpiece. To avoid excessive deformation in the tool at the strike from the plunger, the tool has to possess a relatively high stiffness, and thereby a relatively high mass. As a result, the system for driving the plunger needs to present a high capacity. Further, due to high kinetic energy, the plunger may strike the tool more than one time. This may happen if the work material rebound because of deformation at the strike by the tool and as consequence, the work material strikes in turn the tool thereby pushing the tool towards and in contact again with the plunger. This is an undesirable event. The plunger should only hit the tool once, otherwise the forming of the workpiece may result in impaired properties of the end product, such as weakening and unevenness, or even failure in the production.

Further, it is known in HVF to provide an impact head between the plunger and the movable tool.

There is also a desire to improve the control of the energy provided to a work material in HVF. An improved energy control may improve the nature of the process in the work material. Doing this may improve the overall quality of formed parts. Doing this may expand the applicability of HVF further, e.g. to tasks with even smaller tolerances that those achieved by present HVF processes. There is also a desire to increase the lifetime of an apparatus for high velocity material forming. A further desire is to eliminate the risk of the plunger hitting or striking the tool, or an impact head provided between the tool and the drive unit, more than one time for each forming of a product.

EP3122491B1 describes a way to prevent a rebound of a downwards moving plunger in an HVF apparatus. In the hydraulic drive system for the plunger, a valve closes, in connection with the stroke, the driving connection between a system pressure and the plunger. In addition, to reduce the risk of the tool reaching the workpiece, a damping/resilient element, providing a spring force upwards against the tool, is arranged between the tool and a tool housing.

There is nevertheless a desire to further improve high velocity forming according to the objects mentioned below.

SUMMARY

An object of the invention is to improve the control of the energy provided to a work material in material forming, preferably in high velocity forming. Another object of the invention is to increase the lifetime of the parts included in the apparatus for material forming, preferably in high velocity forming. A further object is to be able to provide a work material with increased quality and smaller tolerances than those achieved by present material forming, and preferably in high velocity forming. Yet a further object is to prevent the drive unit, such as a plunger, to hit/strike the tool more than one time for each forming of a product.

The objects are achieved by a method according to claim 1. This method is discussed below.

Another aspect of the invention provides a method for material forming, by means of a movable impact head and tool combination and a drive unit, the method comprising moving the drive unit to provide kinetic energy to the impact head and tool combination, for the impact head and tool combination to strike a work material, so as to form the work material, wherein a return movement of the movable impact head and tool combination, away from the work material, after the strike of the work material by the impact head and tool combination, is dampened.

Preferably, the dampening of the impact head and tool combination involves dissipating at least a portion of the kinetic energy of the impact head and tool combination return movement. Preferably, the dampening of the impact head and tool combination involves transforming, at least a portion of the kinetic energy of the impact head and tool combination return movement, into heat. The damping may be proportional to the velocity of the impact head and tool combination.

Thereby, the impact head and tool combination may be dampened as it approaches the drive unit. The risk for rebound is decreased or prevented since the impact head and tool combination is dampened. This improves the properties of the end product, avoiding problems with weakening and unevenness, as well as decreasing the risk for failure in the production. Further, the risk of the impact head and tool combination colliding, after the stroke of the work material, with another part of an apparatus for carrying out the method, such as the drive unit, or a tool holder, is reduced. This improves the lifetime of the parts included in the apparatus for material forming, preferably in high velocity forming. The method may however also be used for other types of material forming.

Moving the drive unit may comprise accelerating the drive unit. Providing kinetic energy to the impact head and tool combination may be done in different ways. For example, the drive unit may strike the impact head and tool combination. Thereby, the impact head and tool combination may be at rest before the strike, while the drive unit approaches the impact head and tool combination. Alternatively, the tool may be in contact with the drive unit during at least a major part of, e.g. all of, an acceleration of the drive unit. The tool may be separated from the drive unit before the tool strikes the work material. For the separation, the drive unit may be decelerated.

In some embodiments, wherein moving the drive unit comprises accelerating the drive unit, the drive unit is a plunger arranged to be driven by a hydraulic system. The plunger may be movably arranged in a cylinder housing. The cylinder housing may be mounted to a frame. In alternative embodiments, the drive unit may be arranged to be driven in some alternative manner, for example by explosives, by electromagnetism, or by pneumatics.

The energy of the tool may be adjusted by adjusting the velocity and/or mass of the tool. It is understood that a second tool may be present on the opposite side of the work material. The work material may be a workpiece, such as a solid piece of material, e.g. in the form of a sheet, for example in metal. The work material may alternatively be a material in some other form, e.g. on powder form.

Preferably, the movable impact head and tool combination is dampened so that bouncing of the impact head and tool combination is prevented at its return movement. Thereby, the damage of parts of an apparatus for carrying out the method may be prevented. Also, a contact of the impact head and tool combination with the drive unit, after the strike of the work material, may be prevented.

Preferably, the method comprises providing a frame. The drive unit may be mounted to the frame. A dampening arrangement may be mounted to the frame, wherein the impact head and tool combination is dampened by means of the dampening arrangement. The method may comprise providing the impact head and tool combination in a tool housing. The tool housing may form a part of the frame. The method may comprise providing a dampening arrangement mounted to the tool housing. The impact head and tool combination may be dampened by means of the dampening arrangement. In some embodiments, the damping arrangement may be mounted to the impact head and tool combination.

Preferably, the return movement of the impact head and tool combination is dampened by means of the dampening arrangement. Preferably, the dampening arrangement is arranged to dampen the return movement by dissipation of at least a portion of the kinetic energy of the impact head and tool combination during the return movement. Preferably, the dampening arrangement is arranged to dampen the return movement by transforming, at least a portion of the kinetic energy of the impact head and tool combination, into heat.

Preferably the tool housing forms part of the frame and the dampening arrangement comprises a first dampening element arranged between the tool housing and a surface of the impact head and tool combination facing away from the work material. Thereby the first dampening element may dampen the return movement of the impact head and tool combination. The first dampening element may be mounted to the frame. The first dampening element may be mounted to the tool housing. Alternatively, the first dampening element may be mounted to the impact head and tool combination.

The first dampening element is preferably arranged between a shoulder of the frame, e.g. the tool housing thereof, and a surface of the impact head and tool combination facing away from the work material, at a foot portion of the impact head and tool combination, provided laterally, in relation to a direction of the strike of the work material, outside a surface, of the impact head and tool combination, contacting the work material when the work material is struck.

Suitably, the dampening arrangement comprises a second dampening element. The second damping element may be arranged between the frame and a surface of the impact head and tool combination facing towards the work material. The second damping element may be arranged between the tool housing and a surface of the impact head and tool combination facing towards the work material. The second dampening element may be mounted to the frame. The second dampening element may be mounted to the tool housing. Alternatively, the second dampening element may be mounted to the impact head and tool combination.

The second dampening element may serve as a spring. The second dampening element may be arranged to accumulate elastic energy during the movement of the impact head and tool combination towards the work material, before the work material is struck. After the strike, the elastic energy may be released so as to urge the impact head and tool combination away from the work material. Thereby, the first dampening element may serve to dampen the resulting return movement of the impact head and tool combination. It should be noted that the second dampening element may also be arranged to dampen the movement towards the work material, by dissipation of a portion of the kinetic energy of the impact head and tool combination during the movement towards the work material.

In some embodiments the impact head and tool combination may be restrained between the dampening elements. Thereby, the elastic elements may be arranged to accumulate elastic energy so as to create counteracting spring forces acting on the impact head and tool combination. Thereby, the impact head and tool combination may be squeezed in between the first and second dampening elements. Thereby any play between the tool housing and the impact head and tool combination may be reduced or eliminated. Thereby, the movements of the impact head and tool combination may be controlled so as to reduce or eliminate any undesired movement of the impact head and tool combination, for example a movement causing a second collision with the drive unit or the work material, a lateral movement, or a rotational movement. Preferably, contact is kept between the impact head and tool combination, and the frame, via the damping elements, throughout the entire process of striking the work material. Said process may be considered as extending in time, from a status of rest of the impact head and tool combination, through the strike of the work material, and up to a time when the impact head and tool combination is again at rest.

Further, the hardness of the first dampening element may preferably be lower than the hardness of the second dampening element. Thereby, when the impact head and tool combination is restrained between the first and second dampening elements, the first element may be more compressed that the second element. Thereby, it may be secured that there is no contact between the impact head and tool and the work material, when the impact head and tool combination is at rest. Preferably the compression of the first dampening element, when the impact head and tool combination is at rest, is larger than the distance from the rest position, of the impact head and tool combination, to the position that the impact head and tool combination has at the strike of the work material. Thereby, it may be secured that the first and second dampening remain in contact with the impact head and tool combination, and with the frame, during the entire striking process. For example, if the movement from the rest position to the striking position is a certain distance, e.g. 2 mm, then the compression of the first dampening element, at the rest position, is larger than that certain distance, e.g. larger than 2 mm.

In some embodiments, the drive unit provides the kinetic energy to the impact head and tool combination, by striking the impact head and tool combination. Preferably, the drive unit moves, upon the impact with the impact head and tool combination, away from the work material. The movement of the drive unit, upon the impact with the impact head and tool combination, may be secured by an appropriate selection of the mass of the drive unit, the mass of the impact head and tool combination, and the driving force acting on the dive unit at the time of impact with the impact head. This provides for avoiding that the impact head and tool combination contacts the drive unit during the return movement of the impact head and tool combination.

The control of the movements of the impact head and tool combination may in some embodiments be provided solely by the impact head and tool combination being restrained between the first and second dampening elements. This may suffice where the impact head and tool combination travels a relatively short distance in relation to the frame.

However, in some embodiments, the impact head and tool combination may travel a relatively long distance. In some examples, the method comprises providing a guiding arrangement for the impact head and tool combination. For example, the guiding arrangement may comprise a plurality of pins, which may be fixed to the tool or the frame. However, alternatives are possible. For example, a frame, surrounding the impact head and tool combination, or the path of the tool, may be arranged to guide the impact head and tool combination towards and in engagement with the dampening arrangement mounted to the frame. Thereby, one or more guiding devices, which are fixed to the impact head and tool combination, may be arranged to engage with the frame while the tool moves along the frame, towards and in engagement with the dampening arrangement mounted to the frame at the return movement of the impact head and tool combination. The guiding of the impact head and tool combination allows an accurate positioning of the tool onto the work material.

In some embodiments the impact head and tool combination comprises a tool to strike the work material, and an impact head to receive a strike from the moving drive unit. Thereby, the method may comprise fixing the tool and the impact head to each other by attachment means provided adjacent the perimeter edges of the tool and the impact head. E.g. the tool and the impact head may be pulled together by a bolt connection, comprising one or more bolts. Further, the attachment means of the tool and the impact head may be positioned within a recess of the frame, e.g. the tool housing thereof, formed by the shoulder. The impact head and tool combination may be connected as a solid unit, wherein the tool and the impact head are fixed to each other, without any relative movement between each other. Further, the movement of the impact head and tool combination within the recess of the frame, e.g. the tool housing thereof, is limited and can be controlled. Thereby, specifically advantageous embodiments may be provided. A perimeter region of the impact head and tool combination, surrounding a wording surface of the tool, may provide the double function of connecting the impact head and the tool, and controlling the impact head and tool combination movement by being restricted between the first and second dampening elements. As exemplified below, such a perimeter region may be provided by respective collars of the impact head and the tool.

The other aspect of the invention also provides an apparatus for material forming, by means of a movable impact head and tool combination and a drive unit, the apparatus being arranged to move the drive unit to provide kinetic energy to the movable impact head and tool combination, for the movable impact head and tool combination to strike a work material, so as to form the work material, wherein the apparatus is arranged so as for a return movement of the movable impact head and tool combination, away from the work material, to be dampened, after the strike of the work material by the movable impact head and tool combination. Where the apparatus is arranged so as for the movable impact head and tool combination to be dampened, the apparatus may be arranged to prevent bouncing of the movable impact head and tool combination its return movement. Advantages with such an apparatus is understood from the description above of embodiments of the method of the other aspect of the invention.

In some embodiments, the drive unit is arranged mounted to a frame and a dampening arrangement is mounted to the frame, wherein the impact head and tool combination is arranged to be dampened by means of the dampening arrangement. A tool housing may form a part of the frame. The dampening arrangement may comprise a first dampening element arranged between the frame, e.g. the tool housing thereof, and a surface of the impact head and tool combination facing away from the work material. Preferably, the frame, e.g. the tool housing thereof, comprises a shoulder, the impact head and tool combination comprises a foot portion, provided laterally, in relation to a direction of the strike of the work material, outside a surface, of the impact head and tool combination, arranged to contact the work material when the work material is struck, and the shoulder of the tool housing is arranged to extend over a surface of the foot portion facing away from the work material. Preferably, the dampening arrangement comprises a second dampening element arranged between the frame, e.g. the tool housing thereof, and a surface of the impact head and tool combination facing towards the work material. The impact head and tool combination may be arranged in restrained engagement between the dampening elements. Preferably, the first dampening element is provided with a lower hardness than the second dampening element.

In some embodiments, where the impact head and tool combination comprises a tool to strike the work material, and an impact head to receive a strike from the moving drive unit, the tool and the impact head may be fixed to each other by attachment means provided adjacent the perimeter edges of the tool and the impact head, e.g. by a bolt connection. Preferably, the attachment means of the tool and the impact head are positioned within a recess of the frame, e.g. the tool housing thereof, formed by the shoulder.

The objects are achieved by a method according to claim 1. Thus, the objects are achieved by a method for material forming, by means of a movable tool and a drive unit, the method comprising moving the drive unit to provide kinetic energy to the tool, for the tool to strike a work material, so as to form the work material, the method comprising providing an impact head between the drive unit and the movable tool, and providing the kinetic energy to the tool by the drive unit striking the impact head, the impact head extending in the direction of the stroke from an impact end to a base region, where the base region is closer to the tool than the impact end, wherein arranging the impact head so that the impact end has laterally, in relation to the direction of the stroke, a smaller extension than the base region.

Thereby, an increased lateral extension from the impact end to the base region may be provided. Thereby, the energy from a strike of the drive unit on the impact end of the impact head may be distributed outwardly in a direct manner. Thereby, the kinetic energy may be distributed in a direct manner over a working surface of the tool, intended to contact the work material. Compared to a solution where the energy is distributed more centrally, and then outwardly, this is advantageous. It will reduce any deformation of the tool due to the kinetic energy being distributed with some delay to some parts of the tool. Thus, a simultaneous transfer of kinetic energy to all parts of the impact head may be accomplished. This improves the properties of the end product, avoiding problems with weakening and unevenness, as well as decreases the risk for failure in the production. Also, by reducing deformation of the tool, thereby reducing fatigue, the lifetime of the parts included in the apparatus for material forming is improved.

It should be noted that the impact end may be arranged to be in contact with the drive unit, e.g. at an impact of the drive unit to the impact head. The base region may be at a distance from an interface of the impact head with the tool. Thereby, the base region may be located between the impact end and the interface. However, in some embodiments, the base region may be at the interface. A portion of the impact head extending from the impact end to the base region is herein also referred to as a first portion of the impact head.

Although many of the examples herein relate to high velocity forming, the method may also be used for other types of material forming.

Preferably, the method comprises providing the drive unit mounted to a frame, and the impact head and the tool are movable in relation to the frame, e.g. a tool housing of the frame. Preferably, perimeter edges of the base region of the impact head are, in the stroke direction, outside of, and/or substantially coinciding with, perimeter edges of a working surface of the tool which comes into contact with the work material at the stroke. Suitably, the impact head narrows off in the direction away from the tool, so as for the impact head to transfer kinetic energy directly towards the perimeter edges of the tool by a stroke of the drive unit to the impact head. Further, the method preferably comprises tapering the impact head in a direction away from the work material. Thereby, the impact head may spread kinetic energy evenly to the tool from the impact end to the base region.

In some embodiments, the impact end may present a circular impact surface for the drive unit. Thereby, the impact surface may be adapted to receive a strike from a cylindrical piston of the drive unit. The diameter of the impact surface may the substantially the same as the diameter of the piston. Thereby, a uniform transfer of kinetic energy to the impact head may be accomplished. The base region may have any suitable shape. For example, the base region may be rectangular, or circular, in a plane which is transverse to the direction of the strike of the work material. Thus, in some embodiments, the impact head may present a gradual change of cross-sectional shape from the impact end to the base region, e.g. from a circular shape to a rectangular shape.

Yet further, the method preferably comprises providing the impact head and the tool with a respective collar at an interface between the impact head and the tool, the collar of the tool surrounding, as seen in the direction of the stroke, a working surface of the tool which comes into contact with the work material at the stroke, wherein a first portion of the impact head extends from the collar of the impact head, to the impact end of the impact head, wherein the first portion presents a perimeter edge at the collar, which, as seen in the direction of the stroke, substantially coincides with the working surface. Preferably, the method comprises arranging the first portion so that the first portion has laterally, in relation to the direction of the stroke, a smaller extension at the impact end than at the impact head collar. The perimeter edge, at the collar, coinciding with the working surface, allows kinetic energy to be distributed directly and evenly over the entire work surface. This reduces deformations of the work surface. This improves the quality of the result of the process.

Preferably, the method comprising arranging the collars in a recess of a frame, e.g. a tool housing thereof. The frame, e.g. the tool housing thereof, may be arranged to hold the impact head and the tool. The frame, e.g. the tool housing thereof, may be arranged to guide the impact head and the tool at a strike of the work material. Further, the method may comprise arranging a first dampening element between a surface of the impact head collar, facing away from the work material, and a shoulder of a frame, e.g. a tool housing thereof. Suitably, the method comprising arranging a second dampening element between a surface of the tool collar, facing away from the impact head, and a shoulder of a frame, e.g. a tool housing thereof. The collars may be restrained between the dampening elements. Thereby, the collars may serve the dual purpose of providing a controlled movement of the impact head and tool combination, and providing for connecting the impact head and the tool, e.g. with a bolt connection.

The invention also provides an apparatus for material forming, by means of a tool and a drive unit, the apparatus being arranged to move the drive unit to provide kinetic energy to the tool, for the tool to strike a work material, so as to form the work material, the apparatus being provided with an impact head between the drive unit and the movable tool, and the apparatus being arranged to provide the kinetic energy to the tool by the drive unit striking the impact head, the impact head extending in the direction of the stroke from an impact end to a base region, where the base region is closer to the tool than the impact end, wherein the impact head is arranged so that the impact end has laterally, in relation to the direction of the stroke, a smaller extension than the base region. Advantages with such an apparatus is understood from the description above of embodiments of the method according to any of claims 1-7.

In some embodiments, the impact head and the tool are arranged to be movable in relation to a frame. The frame may comprise a tool housing. The frame, e.g. the tool housing thereof, may be arranged to hold the impact head and the tool. The frame, e.g. the tool housing thereof, may be arranged to guide the impact head and the tool at a strike of the work material. In some embodiments, the drive unit is mounted to a frame, and the impact head and the tool are arranged to be movable in relation to a tool housing of the frame. Preferably, the apparatus is arranged so as for perimeter edges of the base region of the impact head to be, in the stroke direction, outside of, and/or substantially coinciding with, perimeter edges of a working surface of the tool which is arranged to come into contact with the work material at the stroke. Suitably, the impact head narrows off in the direction away from the tool, and the apparatus is arranged so as for the impact head to transfer kinetic energy towards the perimeter edges of the tool by a stroke of the drive unit to the impact head. Preferably, the impact head is tapered in a direction away from the tool, and the apparatus is arranged so as for the impact head to spread kinetic energy over the tool from the impact end to the base region. Preferably, the impact head and the tool comprises a respective collar at an interface between the impact head and the tool, the collar of the tool surrounding, as seen in the direction of the stroke, a working surface of the tool which is arranged to come into contact with the work material at the stroke, wherein a first portion of the impact head extends from the collar of the impact head, to the impact end of the impact head, wherein the first portion presents a perimeter edge at the collar, which, as seen in the direction of the stroke, substantially coincides with the working surface. The first portion may be arranged so that the first portion has laterally, in relation to the direction of the stroke, a smaller extension at the impact end than at the impact head collar. The collars may be arranged in a recess of a frame, e.g. a tool housing thereof. Preferably, a first dampening element is arranged between a surface of the impact head collar, facing away from the work material, and a shoulder of a frame, e.g. a tool housing thereof. A second dampening element may be arranged between a surface of the tool collar, facing away from the impact head, and a shoulder of a frame, e.g. a tool housing thereof. The collars may be arranged to be restrained between the dampening elements.

Further advantages and advantageous features of the invention are disclosed in the following description and in the dependent claims.

BRIEF DESCRIPTION OF THE DRAWINGS

Below, embodiments of the invention will be described with reference to the drawings, in which.

DETAILED DESCRIPTION OF EMBODIMENTS OF THE INVENTION

Figure 1:
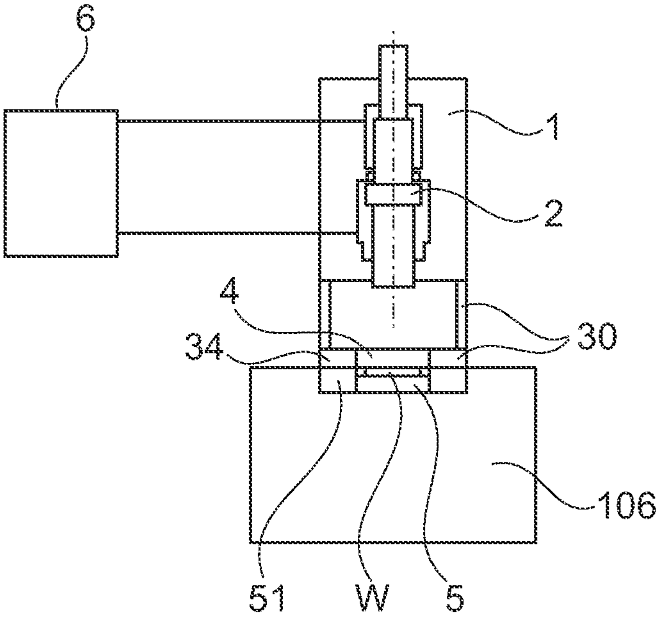
FIG. 1 shows a partially sectioned, schematic view of an apparatus for material forming according to an embodiment of the invention.

FIG. 1 shows an apparatus for material forming according to an embodiment of the invention. According embodiments of the invention, the apparatus comprises a tool housing holding a movable impact head and tool combination 4. The tool housing may form a part of a frame 30. The apparatus further comprises a drive unit in the form of a plunger 2, as shown in FIG. 1. In the embodiment shown in FIG. 1, a drive assembly comprises a cylinder housing 1. Further, the drive assembly comprises the plunger 2, that is arranged in the cylinder housing 1. The cylinder housing 1 may be mounted to the frame 30.

Figure 2:
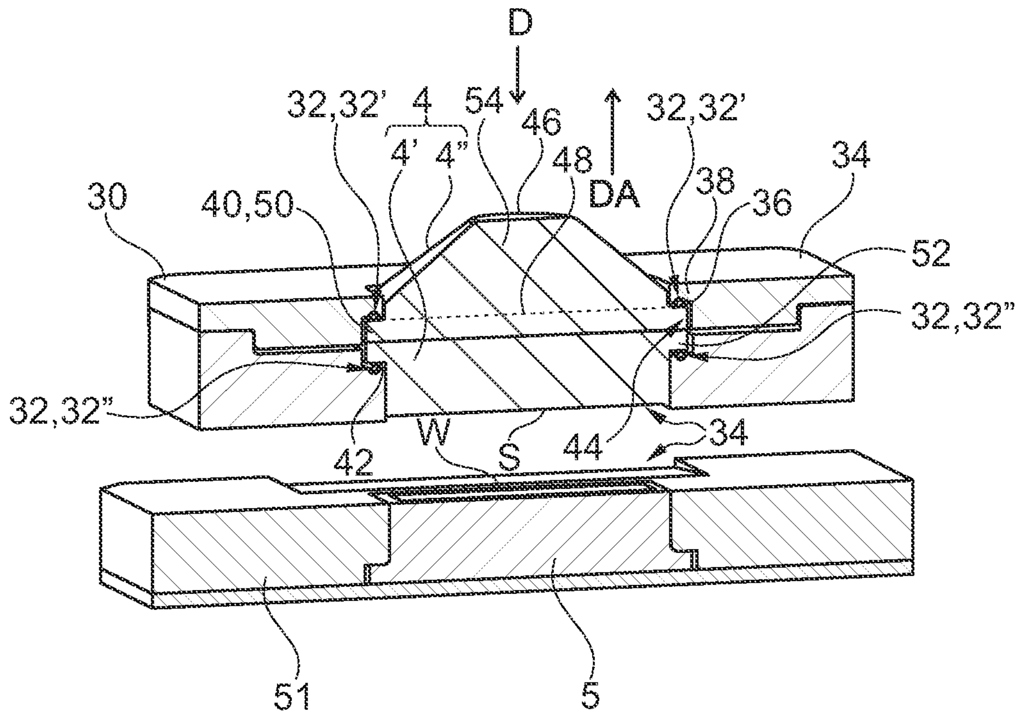
FIG. 2 shows schematically a sectioned perspective view of a part of the apparatus in FIG. 1.

An anvil 106 is fixed to the frame. A fixed tool 5 is mounted to the anvil 106. The fixed tool 5 is mounted to an upper side of the anvil 106. A movable impact head and tool combination 4, described closer below with reference to FIG. 2, is located above the fixed tool 5. The tools 4, 5 present complementary surfaces facing each other. A work material W is removably mounted to the fixed tool 5. The work material W may be mounted to the fixed tool 5 in any suitable manner, e.g. by clamping, or with vacuum. The work material W could be of a variety of types, for example a piece of sheet metal. It should be noted that in some embodiments, what is herein referred to as a fixed tool could also be movable.

The plunger 2 is arranged to move towards and away from the fixed tool 5, as described closer below. The plunger 2 is arranged to be driven by a hydraulic system 6. With respect to the plunger 2, driven by a hydraulic system pressure, reference is made to the disclosure of EP3122491B1, which is hereby incorporated by reference.

The apparatus is arranged to move the plunger 2 to provide kinetic energy to the movable impact head and tool combination 4, for the movable impact head and tool combination 4 to strike a work material, so as to form the work material W.

Before providing kinetic energy to the movable impact head and tool combination 4 by moving or accelerating the plunger 2 to strike the movable impact head and tool combination 4, the movable impact head and tool combination 4 may be positioned at any suitable distance from the work material W. As an example, the distance may be 1-10 mm, e.g. 1.5-5 mm, or 2-3 mm.

The apparatus is arranged so as for a return movement of the movable impact head and tool combination 4, away from the work material W, to be dampened, after the strike of the work material W by the movable impact head and tool combination 4. Where the apparatus is arranged so as for the movable impact head and tool combination 4 to be dampened, the apparatus may be arranged to prevent bouncing of the movable impact head and tool combination 4 its return movement.

FIG. 2 shows schematically the movable impact head and tool combination 4, and surrounding parts, of the apparatus in FIG. 1. The frame 30 may comprise a tool housing 34. The fixed tool 5 is provided in a tool support 51.

FIG. 2 shows, for the sake of this presentation, the tool housing 34 is presented as separated from the tool support 51. However, when the apparatus is in use, the tool housing 34 would be in contact with the tool support 51. Thus, in FIG. 2 depicts the impact and tool combination 4 at a distance from the fixed tool 5. Thus, in FIG. 2, the impact head and tool combination 4 is illustrated as being positioned at a significant distance from the work material W. However, for striking the work material, the impact head and tool combination 4 is in this example positioned much closer towards the work material W. Nevertheless, for changing the work material, the tool housing 34 may be separated from the tool support 51, e.g. as depicted in FIG. 2. For example, this separation may be assisted by a guiding arrangement, arranged to guide the movement of the tool housing.

Figure 3:
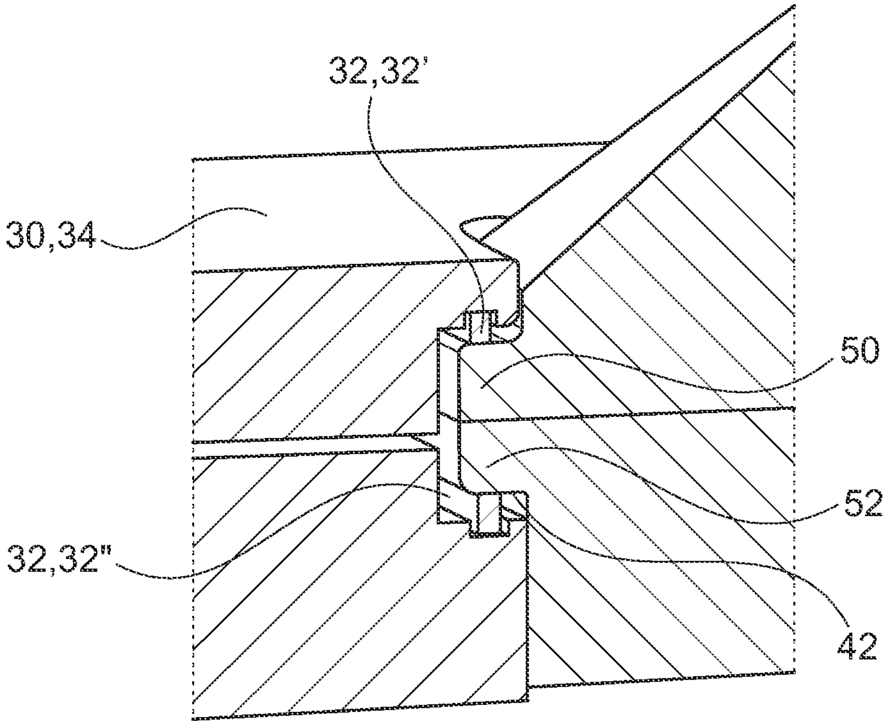
FIG. 3 shows a part of FIG. 2 in greater detail.

Reference is made also to FIG. 3. A dampening arrangement 32 may be mounted to the frame 30, in this example to the tool housing 34. The impact head and tool combination 4 may be arranged to be dampened by means of the dampening arrangement 32. The dampening arrangement 32 may comprise a first dampening element 32' arranged between the tool housing 34 and a surface 36 of the impact head and tool combination 4 facing away from the work material W. The tool housing 34 may be provided with a shoulder 38. The impact head and tool combination 4 can be provided with a foot portion 40, provided laterally, in relation to a direction of the strike D of the work material, outside a surface S, of the impact head and tool combination 4, arranged to contact the work material W when the work material is struck. The shoulder 38 of the tool housing is in this example arranged to extend over a surface of the foot portion 40 facing away from the work material W.

Preferably, the dampening arrangement 32 comprises a second dampening element 32" arranged between the tool housing 34 and a surface 42 of the impact head and tool combination 4 facing towards the work material W. The impact head and tool combination 4 may be arranged in restrained engagement between the dampening elements 32', 32". Preferably, the first dampening element 32' is provided with a lower hardness than the second dampening element 32".

The dampening elements 32', 32" may be in any suitable material, for example polyurethane, or rubber. The material may be elastic. The material may have a dampening quality. The material may be suitable to dissipate the kinetic energy of the impact head and tool combination 4. Alternatively, the dampening elements 32', 32" may be provided as damping springs. In this example, the dampening elements are provided as elongated strips 32', 32". The strips 32', 32" have a rectangular cross-section. The strips are partially fitted in a respective groove of the tool housing. Alternatively, or in addition, the strips could be partially fitted in a respective groove in the foot portion 40. The strips are 32', 32" laterally positioned externally of a working surface S of the impact head and tool combination 4. As seen in the direction of the strike D, the strips 32', 32" surround the working surface S. Alternatively, one of, or each of, the dampening elements 32', 32" may be provided a plurality of separated elements.

The material of the first dampening element may be elastic. The material may have a dampening quality. The material may be suitable to dissipate the kinetic energy of the impact head and tool combination 4. The dimensions, and the material, of the first damping element, are preferably adapted to avoid excessive heat generation due to the dissipation of kinetic energy of the impact head and tool combination.

The material of the second dampening element may be elastic. The material may further have a dampening quality. The dimensions, and the material, of the second damping element, are preferably adapted to avoid excessive heat generation during its deformation in the striking process.

In the embodiment shown in FIGS. 1 and 2, the impact head and tool combination 4 comprises a tool 4' to strike the work material W. The impact head and tool combination 4 further comprises an impact head 4" to receive a strike from the moving drive unit 2. The tool 4' and the impact head 4" may be fixed to each other by attachment means provided adjacent the perimeter edges of the tool and the impact head, e.g. by a bolt connection. Preferably, the attachment means of the tool 4'and the impact head 4" are positioned within a recess 44 of the tool housing 34 formed by the shoulder 38. Said dampening elements 32', 32" are preferably also provided within the recess 44. The recess 44 is laterally positioned externally of the working surface S of the impact head and tool combination 4. As seen in the direction of the strike D, the recess 44 surrounds the working surface S.

Preferably, the impact head 4" and the tool 4' comprises a respective collar 50, 52 at an interface between the impact head 4" and the tool 4', the collar 52 of the tool 4' surrounding, as seen in the direction of the stroke D, the working surface S of the tool which is arranged to come into contact with the work material W at the stroke. Said collars 50, 52 may thereby form said foot portion 40. Both collars 50, 52 may extend into the recess 44. The collar 50 of the impact head 4" may be arranged to be in contact with the first damping element 32'. The collar 52 of the tool 4' may be arranged to be in contact with the second damping element 32". Bolts of said bolt connection may extent through the collars 50. 52.

At a strike, the impact head and tool combination 4 moves towards the work material W, and thereby it compresses the second dampening element 32". When the work material W has been struck, elastic energy in the second dampening element 32" moves the impact head and tool combination 4 away from the work material W. Thereby, the first dampening element 32' dampens the movement of the impact head and tool combination 4, as it moves away from the work material W. Thereby, a closely controlled reciprocating movement of the impact head and tool combination 4 at a strike is accomplished.

The impact head 4" extends in the direction of the stroke D from an impact end 46 to a base region 48, where the base region 48 is closer to the tool 4' than the impact end 46. The impact head 4" is arranged so that the impact end 46 has laterally, in relation to the direction of the stroke D, a smaller extension than the base region 48. The base region 48 is in this example not at the interface of the impact head 4" with the tool 4'. The base region is at a distance from this interface. The base region 48 is indicate with a broken line in FIG. 2.

As suggested, the impact head 4" and the tool 4' may be mounted to the frame 30 and may be arranged to be movable in relation to the tool housing 34 of the frame 30. Preferably, the apparatus is arranged so as for perimeter edges of the base region 48 of the impact head 4" to, in the stroke direction D, substantially coincide with, perimeter edges of the working surface S of the tool 4' which is arranged to come into contact with the work material W at the stroke. Suitably, the impact head 4" narrows off in the direction away DA from the tool 4'.The apparatus in this example is arranged so as for the impact head 4" to transfer kinetic energy, from a stroke of the plunger 2 to the impact head 4", directly to the entire working surface S. A first portion 54 the impact head 4", between the impact end and the base region 48, is tapered in a direction away DA from the tool 4'. The apparatus is arranged so as for the impact head 4" to spread kinetic energy directly over the working surface S from the impact end 46.

As suggested, the impact head 4" and the tool 4' in this example comprise a respective collar 50, 52 at an interface between the impact head 4" and the tool 4'. The collar 52 of the tool 4' surrounds, as seen in the direction of the stroke D, the working surface S of the tool which is arranged to come into contact with the work material W at the stroke. The first portion 54 of the impact head 4" extends from the collar 50 of the impact head 4", to the impact end 46 of the impact head. The first portion 54 presents a perimeter edge at the collar 50, i.e. at the base region 48, which, as seen in the direction of the stroke D, substantially coincides with the working surface S. The first portion 54 may be arranged so that the first portion 54 has laterally, in relation to the direction of the stroke D, a smaller extension at the strike end 46 than at the impact head collar 50. As suggested, the collars 50, 52 are in this example arranged in the recess 44 of the tool housing 34. Thereby the dampening elements 32', 32" may be separated from, and not "interfere" with, the direct transfer of kinetic energy from the impact end 46 to the working surface S.

Figure 4:
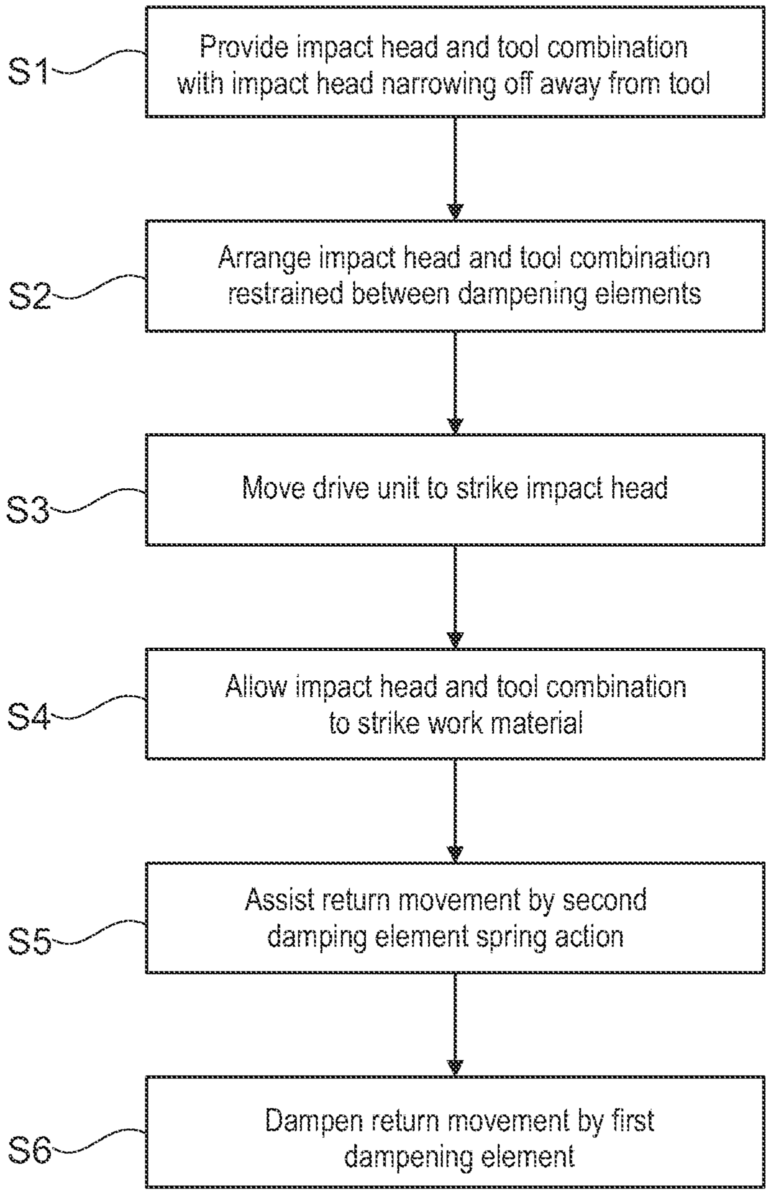
FIG. 4 is a flow chart depicting steps in the method according to an embodiment of the invention.

FIG. 4 is a flow chart depicting steps in the method according to the embodiment of the invention described with reference to FIG. 1-3. The method comprises providing S1 an impact head and tool combination 4, with a tool, and with an impact head 4" which narrows off in the direction away from the tool 4'. Subsequently, the impact head and tool combination 4 is arranged S2 so as to be restrained between first and second dampening elements 32', 32". Subsequently the drive unit is moved S3 so as to strike the impact head, thereby providing kinetic energy to the impact head and tool combination 4. Thereby, the impact head 4" transfers kinetic energy towards the perimeter edges of the tool. The method further comprises allowing S4 the impact head and tool combination, thus provided with kinetic energy, to strike the work material W, so as to form the work material. Thereupon, a return movement of the movable impact head and tool combination 4, away from the work material, is enabled or assisted S5 by a spring action of the second damping element 32". Further, the return movement of the movable impact head and tool combination 4, is dampened S6 by the first dampening element 32'.

Preferably, the drive unit 2, in this example the plunger, moves, upon the impact with the impact head, away from the work material. Thus, the drive unit 2 may be arranged to move, upon the impact with the impact head, away from the work material. The drive unit 2 may be arranged to bounce, upon the impact with the impact head. The movement of the drive unit 2, upon the impact with the impact head, may be secured by an appropriate selection of the mass of the drive unit, the mass of the impact head and tool combination. The movement of the drive unit 2, upon the impact with the impact head, may be further secured by an appropriate selection of the driving force, e.g. the hydraulic force, on the dive unit, at the time of impact with the impact head.

The movement of the drive unit away from the work material, upon the impact with the impact head, provides for avoiding that the impact head and tool combination contacts the drive unit during the return movement of the impact head and tool combination.

Figure 5:
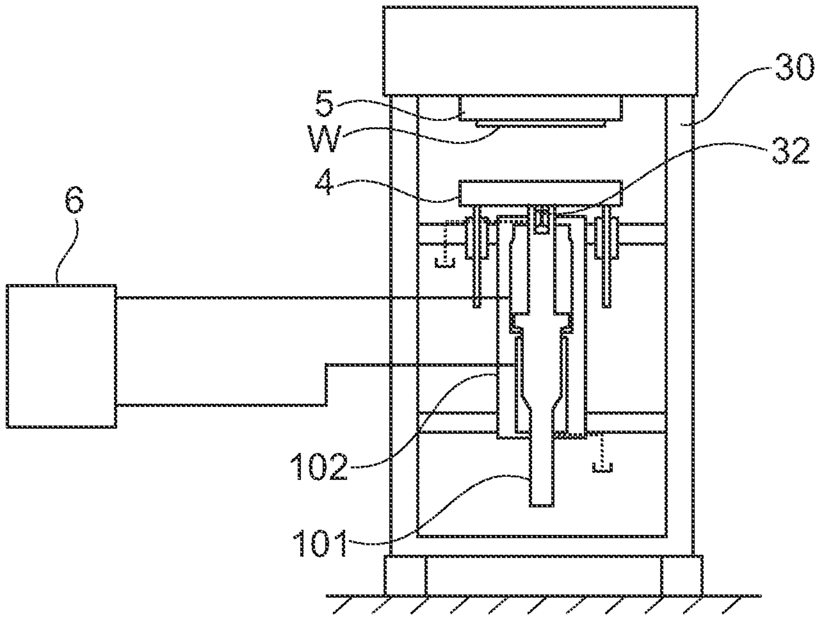
FIG. 5 shows an apparatus for material forming according to another embodiment of the invention.

FIG. 5 shows an apparatus for high velocity material forming according to another embodiment of the invention. The same reference numerals are used for the corresponding features as shown and described with reference to FIGS. 1 and 2. The apparatus comprises a frame 30. The frame is supported by a plurality of support devices 110. An anvil 106 is fixed to the frame. In this embodiment, the anvil 106 is fixed at the top of the frame 30.

A tool, herein referred to as a fixed tool 5, is mounted to the anvil. The fixed tool 5 is mounted to a lower side of the anvil 106. A movable impact head and tool combination 4, described closer below, is located below the fixed tool 5. The impact head and tool combination 4 and the fixed tool 5 present complementary surfaces facing each other. A workpiece W is removably mounted to the fixed tool 5. The workpiece W may be mounted to the fixed tool 5 in any suitable manner, e.g. by clamping, or with vacuum. The workpiece W could be of a variety of types, for example a piece of sheet metal.

In the embodiment shown in FIG. 5, a drive assembly comprising a cylinder housing 102 is mounted to the frame 30. Further, the drive assembly comprises a plunger 101 that is arranged in the cylinder housing 102. The plunger 101 is elongated, and has, as understood from the description below, a varying width along its longitudinal axis. Preferably, any cross-section of the plunger is circular. The plunger 101 is arranged to move towards and away from the fixed tool 5, as described closer below.

In this embodiment, the impact head and tool combination 4 is in contact with the plunger 101 as the plunger is accelerated by means of a hydraulic system 6. Therefore, there is no impact between the plunger 101 and the impact head and tool combination 4. Therefore, what is here referred to as an impact head and tool combination 4 may be provided with an "impact head" forming merely a support for a tool of the impact head and tool combination 4. Before providing kinetic energy to the tool by moving or accelerating the plunger 101, the tool may be positioned at a distance of at least 12 mm, e.g. 50, 100, or 200 mm, from the work material W.

The plunger 101 is arranged to accelerate the impact head and tool combination 4 towards the fixed tool. The plunger 101 is arranged to be driven by the hydraulic system 6. Before the impact head and tool combination 4 strikes the work material W, the plunger 101 decelerated so that the impact head and tool combination 4 continues by inertia towards the work material W.

When the impact head and tool combination 4 has struck the work material W, the impact head and tool combination 4 moves away from the work material W, and towards the plunger 101 by gravity. To brake the return movement of the movable impact head and tool combination 4 as it approaches the plunger 101, a damping arrangement 32 is provided. In this example, the damping arrangement comprises a damper mounted to the plunger 101. The damper is mounted at the top end of the plunger. The damper may be of any suitable kind, e.g. hydraulic or pneumatic. Alternatively, or in addition, the damper may comprise an elastic element, such as a plate spring. In some embodiments, the damping arrangement may comprise a damper mounted to the impact head and tool combination 4. In further embodiments, the damping arrangement may comprise a damper mounted to the frame 30. The damping arrangement will effectively brake the return movement of the movable tool. The damping arrangement may also prevent bouncing of the movable impact head and tool combination 4 at the end of its return movement. Thereby, the movable impact head and tool combination 4 may be brought back to rest on the plunger in a controlled manner.

It is to be understood that the present invention is not limited to the embodiments described above and illustrated in the drawings; rather, the skilled person will recognize that many changes and modifications may be made within the scope of the appended claims.

The invention claimed is:

1. A method for material forming, by means of a movable tool and a drive unit, the method comprising:

moving the drive unit to provide kinetic energy to the tool, for the tool to strike a work material, so as to form the work material, providing an impact head between the drive unit and the movable tool, providing the kinetic energy to the tool by the drive unit striking the impact head, the impact head extending in the direction of a stroke from an impact end to a base region, where in the base region is closer to the tool than the impact end, arranging the impact head so that the impact end has laterally, in relation to the direction of the stroke, a smaller extension than the base region, and providing the impact head and the tool with a respective collar at an interface between the impact head and the tool, the collar of the tool surrounding, as seen in the direction of the stroke, a working surface of the tool which comes into contact with the work material during the stroke, wherein a first portion of the impact head extends from the collar of the impact head, to the impact end of the impact head, wherein the first portion presents a perimeter edge at the collar of the impact head, which, as seen in the direction of the stroke, substantially coincides with the working surface.

2. The method according to claim 1, wherein perimeter edges of the base region of the impact head are, in the direction of the stroke, outside of, and/or substantially coinciding with, perimeter edges of a working surface of the tool which comes into contact with the work material during the stroke.

3. The method according to claim 1, wherein the impact head narrows off in a direction away from the tool so as for the impact head to transfer kinetic energy towards perimeter edges of the tool by the stroke of the drive unit to the impact head, wherein the impact head is tapered in a direction away from the work material, so as for the impact head to spread kinetic energy evenly to the tool from the impact end to the base region.

4. The method according to claim 1, comprising arranging the first portion so that the first portion has laterally, in relation to the direction of the stroke, a smaller extension at the impact end than at the collar of the impact head.

5. The method according to claim 1, comprising arranging the collars in a recess of a frame.

6. The method according to claim 1, comprising arranging a first dampening element between a surface of the impact head collar, facing away from the work material, and a shoulder of a frame; the method further comprising arranging a second dampening element between a surface of the collar of the tool, facing away from the impact head, and a shoulder of a frame, wherein the collars are restrained between the dampening elements.

7. An apparatus for material forming, comprising:

a tool and a drive unit, the drive unit configured to provide kinetic energy to the tool for the tool to strike a work material, so as to form the work material, an impact head located between the drive unit and the movable tool, and the apparatus being arranged to provide the kinetic energy to the tool by the drive unit striking the impact head the impact head extending in the direction of the stroke from an impact end to a base region, wherein the base region is closer to the tool than the impact end, wherein the impact head is arranged so that the impact end has laterally, in relation to the direction of the stroke, a smaller extension than the base region, wherein the impact head and the tool comprises a respective collar at an interface between the impact head and the tool, the collar of the tool surrounding, as seen in the direction of the stroke, a working surface of the tool which is arranged to come into contact with the work material during the stroke, and wherein a first portion of the impact head extends from the collar of the impact head, to the impact end of the impact head, wherein the first portion presents a perimeter edge at the collar of the impact head, which, as seen in the direction of the stroke, substantially coincides with the working surface.

8. The apparatus according to claim 7, wherein the apparatus is arranged so as for perimeter edges of the base region of the impact head to be, in the direction of the stroke, outside of, and/or substantially coinciding with, perimeter edges of a working surface of the tool which is arranged to come into contact with the work material during the stroke.

9. The apparatus according to claim 7, wherein the impact head narrows off in a direction away from the tool, and the apparatus is arranged so as for the impact head to transfer kinetic energy towards perimeter edges of the tool by a stroke of the drive unit to the impact head, wherein the impact head is tapered in a direction away from the tool and the apparatus is arranged so as for the impact head to spread kinetic energy over the tool from the impact end to the base region.

10. The apparatus according to claim 7, wherein the first portion is arranged so that the first portion has laterally, in relation to the direction of the stroke, a smaller extension at the impact end than at the impact head collar.

11. The apparatus according to claim 7, wherein the collars are arranged in a recess of a frame.

12. The apparatus according to claim 7, wherein a first dampening element is arranged between a surface of the collar of the impact head, facing away from the work material, and a shoulder of a frame, wherein a second dampening element is arranged between a surface of the collar of the tool, facing away from the impact head, and a shoulder of a frame, wherein the collars are arranged to be restrained between the dampening elements.

* * * * *